US008565187B2

(12) United States Patent
Lee (10) Patent No.: US 8,565,187 B2
(45) Date of Patent: Oct. 22, 2013

(54) FAST RESELECTION TO OTHER RADIO ACCESS TECHNOLOGY AFTER CIRCUIT SWITCHED FALLBACK

(75) Inventor: Anthony S. Lee, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 371 days.

(21) Appl. No.: 12/973,344

(22) Filed: Dec. 20, 2010

(65) Prior Publication Data

US 2011/0222509 A1     Sep. 15, 2011

Related U.S. Application Data

(60) Provisional application No. 61/312,643, filed on Mar. 10, 2010.

(51) Int. Cl.
*H04W 4/00* (2009.01)
(52) U.S. Cl.
USPC .......................... 370/331; 370/328; 370/329
(58) Field of Classification Search
USPC ................... 370/310, 328, 331, 349
See application file for complete search history.

(56) References Cited

U.S. PATENT DOCUMENTS

| | | | | |
|---|---|---|---|---|
| 8,125,960 B2* | 2/2012 | Iwamura et al. | | 370/331 |
| 8,155,653 B2* | 4/2012 | Kubo | | 455/436 |
| 8,243,725 B2* | 8/2012 | Aghili et al. | | 370/354 |
| 8,249,017 B2* | 8/2012 | Chen et al. | | 370/331 |
| 8,279,834 B2* | 10/2012 | Mildh | | 370/331 |
| 8,340,023 B2* | 12/2012 | Watfa et al. | | 370/328 |
| 8,400,931 B2* | 3/2013 | Wong et al. | | 370/244 |
| 2009/0238143 A1* | 9/2009 | Mukherjee et al. | | 370/331 |
| 2009/0258671 A1* | 10/2009 | Kekki et al. | | 455/552.1 |
| 2010/0061305 A1* | 3/2010 | Kubo | | 370/328 |
| 2010/0098023 A1* | 4/2010 | Aghili et al. | | 370/331 |
| 2010/0165940 A1* | 7/2010 | Watfa et al. | | 370/329 |
| 2010/0182971 A1* | 7/2010 | Chin | | 370/329 |
| 2010/0202413 A1* | 8/2010 | Vikberg et al. | | 370/332 |

(Continued)

FOREIGN PATENT DOCUMENTS

WO     WO 2010106397 A1 *  9/2010

OTHER PUBLICATIONS

3rd Generation Partnership Project 2 "3GPP2", Interworking Specification for cdma2000 1x and High Rate Packet Data Systems, Mar. 2006, 3GPP2, Version 1.0, Revision 0, Section 3.1.*

(Continued)

*Primary Examiner* — Hassan Kizou
*Assistant Examiner* — Phyllis Book
(74) *Attorney, Agent, or Firm* — Richard K. Huffman; James W. Huffman (57) ABSTRACT

A wireless apparatus having one or more first radios, one or more second radios, interface control, and a processor. The one or more first radios are coupled to one or more first communication links. The one or more second radios are coupled to one or more second communication links. The interface control is coupled to the radios, and selects and executes communications over a specific one of the one or more second communication links following termination of a fallback session over one of the one or more first communication links, where RAT information is employed by the interface control to select the specific one of the one or more second communication links. The processor receives, processes, and provides to the interface control the RAT information, where the RAT information is received prior to termination of the fallback session or as part of termination of the fallback session.

12 Claims, 5 Drawing Sheets

(56) References Cited

U.S. PATENT DOCUMENTS

| | | | |
|---|---|---|---|
| 2010/0260105 A1* | 10/2010 | Keller et al. | 370/328 |
| 2010/0278142 A1* | 11/2010 | Dwyer et al. | 370/331 |
| 2010/0279691 A1* | 11/2010 | Dwyer et al. | 455/436 |
| 2010/0285797 A1* | 11/2010 | Ghai et al. | 455/426.1 |
| 2010/0302937 A1* | 12/2010 | Hu et al. | 370/225 |
| 2010/0331011 A1* | 12/2010 | Vikberg et al. | 455/456.1 |
| 2011/0013623 A1* | 1/2011 | Hu et al. | 370/355 |
| 2011/0116449 A1* | 5/2011 | Hu et al. | 370/328 |
| 2011/0122809 A1* | 5/2011 | Yun et al. | 370/328 |
| 2011/0122862 A1* | 5/2011 | Yun et al. | 370/352 |
| 2011/0188468 A1* | 8/2011 | Vikberg et al. | 370/331 |
| 2011/0188470 A1* | 8/2011 | Lu et al. | 370/331 |
| 2011/0222509 A1* | 9/2011 | Lee | 370/331 |
| 2012/0184276 A1* | 7/2012 | Pichna et al. | 455/436 |
| 2012/0250548 A1* | 10/2012 | Swaminathan et al. | 370/252 |

OTHER PUBLICATIONS

3rd Generation Partnership Project 2 "3GPP2," Internetworking Specification for cdma2000 1x and High Rate Packet Data Systems, Mar. 2006, 3GPP2, Version 1.0, Revision 0, Section 3.1.*

"3$^{rd}$ Generation Partnership Project; Technical Specification Group Services and System Aspects; Circuit Switched Fallback in Evolved Packet System; Stage 2 (Release 8)" 3GPP TS 23.272 V8.6.0. Technical Specification Dec. 2009 pp. 1-14.

"3$^{rd}$ Generation Partnership Project; Technical Specification Group GSM/EDGE Radio Access Network; Radio Subsystem Link Control (Release 6)" 3GPP TS 45.008 V6.16.0 Technical Specification Apr. 2006. pp. 1-3.

* cited by examiner

FIG. 1 (Prior Art)
PRESENT DAY CELLULAR RADIO ACCESS MECHANISM

FAST RESELECTION TO OTHER RADIO ACCESS TECHNOLOGY AFTER CIRCUIT SWITCHED FALLBACK

CROSS-REFERENCE TO RELATED APPLICATIONS

This application claims the benefit of the following U.S. Provisional Applications, each of which is herein incorporated by reference for all intents and purposes.

| SER. NO. | FILING DATE | TITLE |
| --- | --- | --- |
| 61/312,643 (VTU.10-0010-US) | Mar. 10, 2010 | FAST RESELECTION TO OTHER RAT AFTER CSFB |

BACKGROUND OF THE INVENTION

1. Field of the Invention

This invention relates in general to the field of communications, and more particularly to a method and apparatus for reducing the latency associated with switching back to a high speed data network following a call over a circuit switched network.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of network, say CDMA2000, and high speed data communications over another type of network, say LTE. In the near future, these hybrid solutions will be prevalent within the art.

In order to field such a hybrid system, designers are forced to develop protocols for those instances where two or more co-fielded networks create conflict. This application deals with one such instance, that is, the switching between a high speed data network that provides exclusively for packetized data communications and a circuit switched voice network.

Presently, protocols exist for fallback to a circuit switched network during a high speed data session in order to process an incoming or outgoing call. And provisions exist for a return to the high speed network, notably LTE, following termination of the call. However, the present inventor has noted that the provisions for return to the high speed data network introduce latencies in the system upwards to almost three minutes, which one skilled in the art would agree become significant performance and human factors issues. Although this maximum latency is not what an average user would experience, it is nonetheless probable and as a result is limiting.

Accordingly, what is needed is a technique that would eliminate or substantially reduce the latency experienced upon return to high speed communications following termination of a fallback circuit switched call.

SUMMARY OF THE INVENTION

The present invention, among other applications, is directed to solving the above-noted problems and addresses other problems, disadvantages, and limitations of the prior art.

The present invention provides a superior technique for accomplishing a rapid switchback to a high speed data network following termination of a fallback session. In one embodiment, a wireless apparatus for performing a fast switchback to a first network is provided. The wireless apparatus has one or more first radios, one or more second radios, interface control, and a processor. The one or more first radios are coupled to one or more first communication links. The one or more second radios are coupled to one or more second communication links. The interface control is coupled to the radios, and is configured to select and execute communications over a specific one of the one or more second communication links following termination of a fallback session over one of the one or more first communication links, where RAT information is employed by the interface control to select the specific one of the one or more second communication links. The processor is configured to receive, process, and provide to the interface control the RAT information, where the RAT information is received prior to termination of the fallback session or as part of termination of the fallback session.

One aspect of the present invention contemplates a system for performing a fast switchback to a high speed data network. The system has a first base station and a mobile station. The first base station is configured to provide for wireless communications over one or more data links, where the one or more data links provide exclusively for packetized data communications. The mobile station is wirelessly coupled to the first base station. The mobile station includes one or more circuit switched radios, one or more data radios, interface control, and an ATIM processor. The one or more circuit switched radios are coupled to one or more circuit switched links. The one or more data radios are coupled to the one or more data links. The interface control is coupled to the radios, and is configured to select and execute communications over a specific one of the one or more data links following termination of a circuit switched fallback call over one of the one or more circuit switched links, where RAT information is employed by the interface control to select the specific one of the one or more data links. The ATIM processor is configured to receive, process, and provide to the interface control the RAT information, where the RAT information is received from the first base station prior to termination of the call or as part of termination of the call.

Another aspect of the present invention comprehends a method for performing a fast switchback to a high speed data network. The method includes: within a mobile station, first coupling one or more circuit switched radios to one or more circuit switched links; within the mobile station, second coupling one or more data radios to one or more data links, where the one or more data links provide exclusively for packetized data communications; selecting and executing communications over a specific one of the one or more data links following termination of a circuit switched fallback call over one of the one or more circuit switched links, the selecting comprising: employing RAT information to select the specific one of the one or more data links; and receiving, processing, and providing to the RAT information, where the RAT information is received prior to termination of the call or as part of termination of the call.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
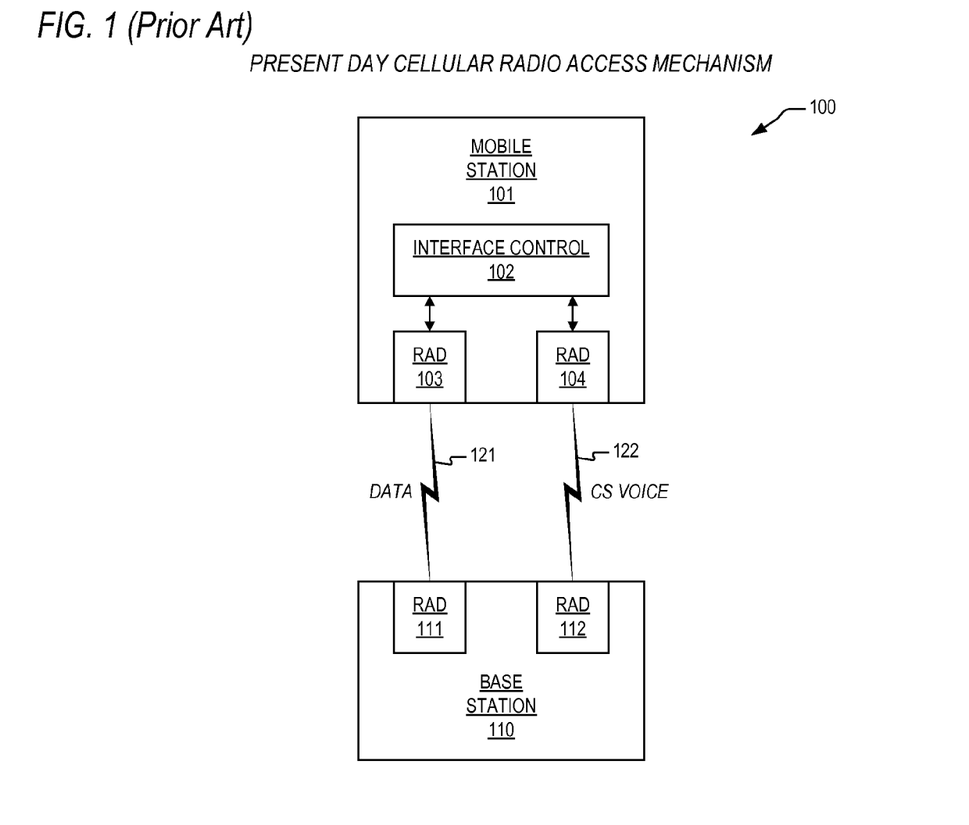
FIG. 1 is a block diagram illustrating a present data cellular radio access mechanism.
Figure 2:
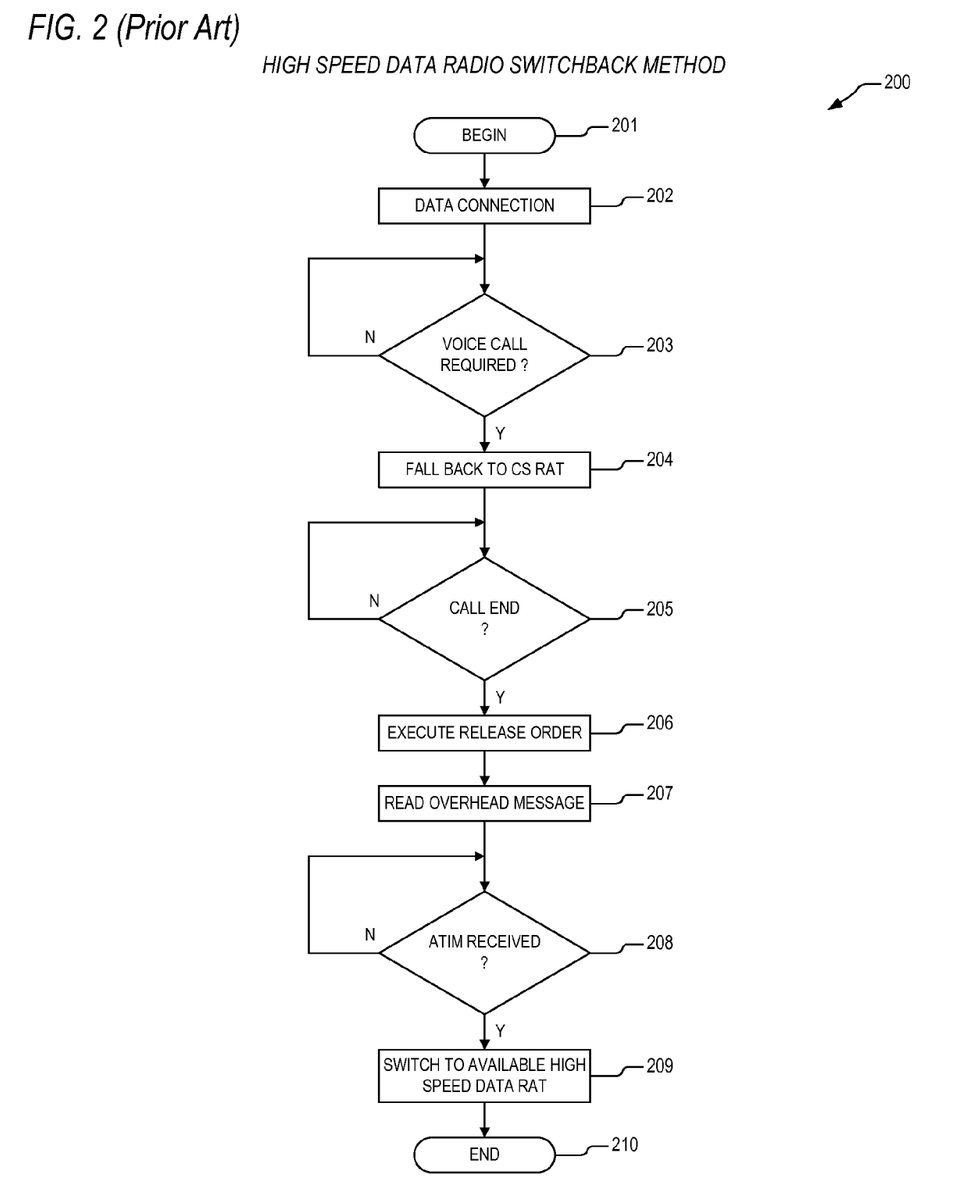
FIG. 2 is a flow diagram depicting a present day high speed data radio switchback method.

In view of the above background discussion on radio access technology selection and associated techniques employed within present day wireless communication systems for switching between high speed data networks and circuit switched networks, a discussion of the limitations of present day apparatus and methods will be presented with reference to FIGS. 1-2. Following this, a discussion of the present invention will be presented with reference to FIGS. 3-5. The present invention overcomes limitations associated with present day network switching techniques by providing a mechanism that significantly reduces the latency related to switching back to a high speed data network following termination of a call over a circuit switched network.

Turning to FIG. 1, a block diagram is presented illustrating a present data cellular radio access mechanism 100. The mechanism includes a mobile station 101 that is wirelessly coupled to a base station 110 over two or more radio links 121, 122. As is clear to one skilled in the art, a present day mobile station 101 may also be referred to as an access terminal, a cell phone, a smart phone, and other substantially similar names. Hereinafter, the term mobile station 101 will be used to encompass all such devices that communicate over a cellular communications network that utilizes at least a high speed data radio link 121 and a circuit switched voice radio link 122. The mobile station 101 has two or more radio devices 103, 104 that couple the mobile station 101 to corresponding radio devices 111, 112 within the base station 110. The mobile station 101 also includes interface control 102 that is coupled to both radios 103, 104. As is appreciated by one skilled in the art, a present day base station 110 may also be referred to as an access node or other names that correspond to mobility devices having substantially similar properties. In addition, for purposes of this application, the mobile station 101 is shown coupled to a single base station 110 that includes both radios 111, 112, however, it is equally probable that separate base stations 110 are provided within the system 100 that each include a specific type of radio 111, 112 unique to the technology employed where handoff communications are affected between the two base stations to allow for interconnectivity with the mobile station 101.

As one skilled in the art will also appreciate, a present day mobile station 101 includes mechanisms to communicate over two or more different types of radio links for purposes of roaming, legacy compatibility, and other reasons. For the purposes of this application, it is sufficient to show and discuss only one such radio link 121, 122 of each type. An example of such links 121, 122 are the circuit switched voice link 122 known as CDMA2000 and the high speed data link 121 known as Long Term Evolution (LTE), however, the disclosed aspects of the present invention are not limited to CDMA2000 and LTE and various other communications protocols and technologies are contemplated by the present invention.

As is alluded to above, more recent high speed data network technologies such as LTE do not include any provisions for placing a voice call according to any conventional methods. Accordingly, options exist to execute a voice call over the high speed data network 121 via Voice over Internet Protocol (VoIP), for example. But for systems that do not provide for VoIP, it is necessary to utilize a conventional circuit switched network 122 to place a voice call. Some systems 100, such as those employing LTE as the high speed data network 121, utilize a technique known as circuit switched fallback (CSFB) to place a voice call. As the name implies, when the mobile station 101 is currently utilizing the high speed data network 121 for packetized data communications, when a requirement arises for a voice call, CSFB techniques dictate that the mobile station fall back to a circuit switched radio link 122, such as CDMA2000, to execute the voice call. And when the call is completed, it is desirable that the mobile station 101 switch back to one of the high speed data network links 121 to continue packetized communications at higher speed.

In order to switch back to the high speed data network link 121, parameters associated with the link 121 must be known and coordinated with the base station 110, such as radio interface type and this information must be made available to the mobile station prior to switchback from the circuit switched link 122. LTE provides these parameters, known as radio access technology (RAT) information records, as part of a routinely transmitted message known as an Alternative Technology Information Message (ATIM) which is transmitted according to multiples of a system time parameter, which is typically 80 ms. However, the present inventor has observed that the latency associated with transmission of the ATIM can be as much as 163.84 seconds not counting the time spent in pilot acquisition, system determination, and other operations associated with obtaining the ATIM.

The present inventor has also noted that a delay as much as 163.84 seconds is highly undesirable from both system performance and human factors perspectives, noting that an operator would infer that his/her mobile station 101 malfunctioned during such a delay, and additionally noting that to routinely incur such delays wastes bandwidth. This disadvantage of present technology is further illustrated below.

Turning now to FIG. 2, a flow diagram 200 is presented depicting a present day high speed data radio switchback method. Flow begins at block 201 where a cellular communications system is providing both circuit switched voice links and high speed data links, where circuit switched fallback is the technique employed to process voice calls. Flow then proceeds to block 202.

At block 202, a mobile station such as the mobile station 101 of FIG. 1 is coupled to a base station via a high speed data RAT that provides exclusively for packetized data transfer. LTE is noted above as being a data network of this nature. Flow then proceeds to decision block 203.

At decision block 203, the mobile station continues to monitor requirements for a voice call. If voice calling is not required, flow proceeds back to the beginning of the decision block 203. The data connection of block 202 is maintained and the mobile station continues to monitor requirements for voice. If a voice call is required, then flow proceeds to block 204.

At block 204, the mobile station (and corresponding base station) execute a fallback to a circuit switched RAT, such as CDMA2000 as is discussed above. Flow then proceeds to decision block 205.

At decision block 205, the voice call is monitored to determine if it is to be terminated. If not, then flow proceeds back around to the decision block 205 and the call is continuously monitored. If termination is required, then flow proceeds to block 206.

At block 206, the mobile station executes a release order sequence to release the voice call. Flow then proceeds to block 207.

At block 207, as part of a flow required to reconnect to a high speed data RAT, the mobile station must receive and read the information included in an overhead message, such as a system parameter message that includes information (e.g. ATIM_CYCLE_INDEX) indicating when the next ATIM is to be transmitted. Under LTE, the ATIM provides the RATs which are available for connection to resume high speed data connectivity. Hence, under LTE, this information must be retrieved in order for the mobile station to reconnect to the high speed data network. LTE specification C.S0005-E v1.0 invokes the requirement to read the overhead message. From the overhead message, the mobile station extracts parameter ATIM_CYLE_INDEX. As one skilled in the art will appreciate, under LTE standards, the broadcast frequency of the ATIM is:

$\lfloor SYS\_TIME_s/16 \rfloor \bmod 2^{ATIM\_CYCLE\_INDEX} = 0$, where
$SYS\_TIME_s$ is the system time in units of 80 ms which, as is discussed above, the ATIM latency can be as long as 163.84 seconds. Flow then proceeds to decision block 208.

At decision block 208, the mobile station waits to receive the ATIM. If the ATIM is not received, the mobile station continues to wait at decision block 208. When the ATIM is received, flow proceeds to block 209. Under LTE, the ATIM provides the RAT information that is used to reconnect back to the high speed data network.

At block 209, using the RAT information provided in the ATIM, the mobile station, in coordination with the base station, executes a switchback to the high speed RAT. Flow then proceeds to block 210. which ends the method.

The flow diagram 200 of FIG. 2 illustrates the deficiencies of today's technologies in that they do not provide for switchback to a high speed RAT following termination of a CSFB call. Accordingly, the present invention contemplates various mechanisms to overcome these costly system delays, which are now presented with reference to FIGS. 3-5.

Figure 3:
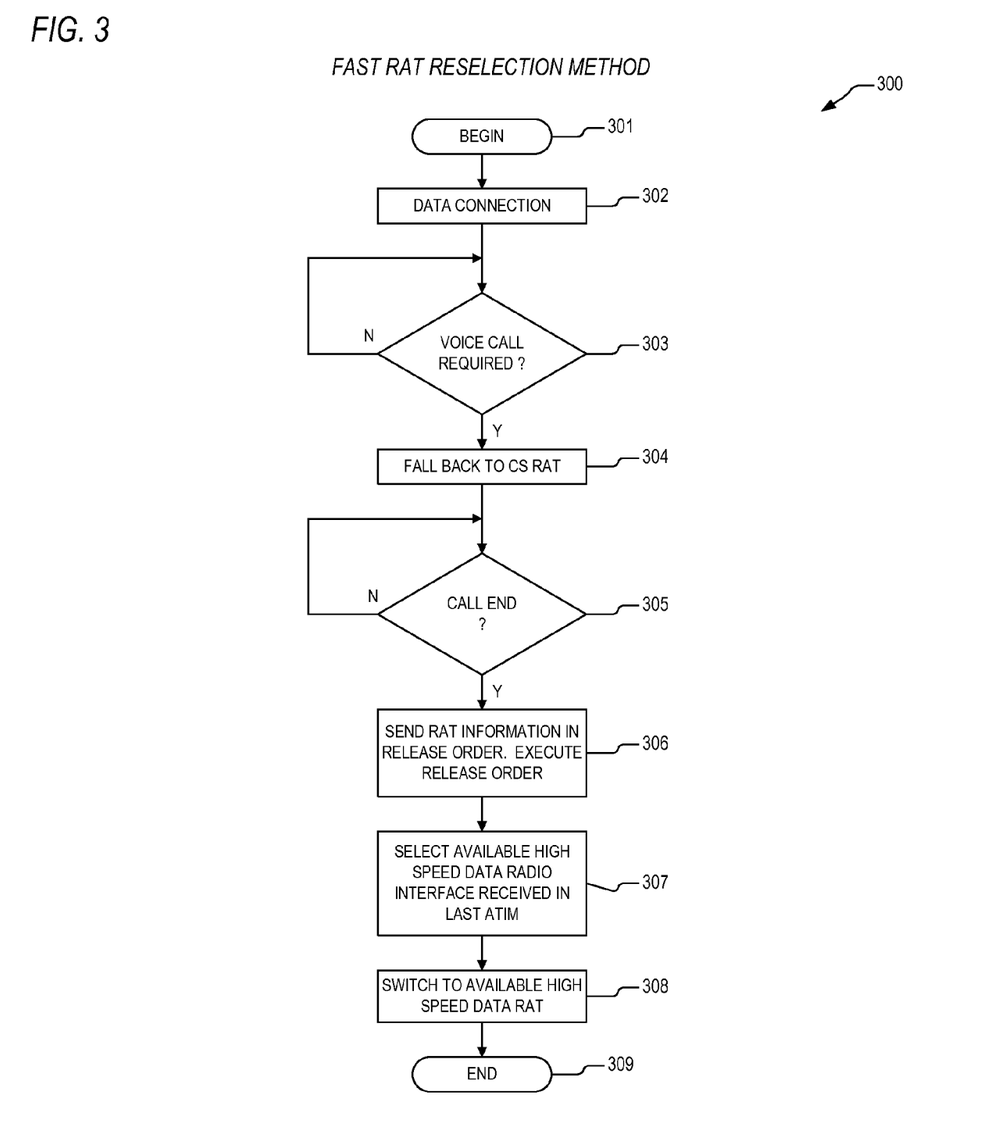
FIG. 3 is a flow diagram featuring a fast radio access technology reselection method according to the present invention.

Referring to FIG. 3, a flow diagram 300 featuring a fast radio access technology reselection method according to the present invention. In operation, a mobile system overcomes the limitations of present day systems by providing information for available high speed data RATs in the release order itself. Thus, the base station provides the RAT information contained in the last ATIM and transmits it to the mobile station as part of the release order. In one embodiment the release order is configured as follows:

| Release Order Specific Field | Length (bits) |
| --- | --- |
| ORDQ | 8 |
| ATIR_INCL | 1 |
| NUM_RADIO_INTERFACE | 4 |
| NUM_RADIO_INTERFACE occurrences of the following Radio Interface record: | |
| { (NUM_RADIO_INTERFACE) | |
| RADIO_INTERFACE_TYPE | 4 |
| RADIO_INTERFACE_LEN | 10 |
| Radio Interface Type-specific fields | 8 × RADIO_INTERFACE_LEN |
| } (NUM_RADIO_INTERFACE) | |

In one embodiment, if NUM_RADIO_INTERFACE is set to 0, this implies that there is no RAT information available and the mobile must default back to the method of FIG. 2, that is, reading the system overhead message, waiting for the ATIM, and then executing switchback to the high speed data RAT. Thus, flow begins at block 301 where a cellular communications system is providing both circuit switched voice links and high speed data links, where circuit switched fallback is the technique employed to process voice calls. Flow then proceeds to block 302.

At block 302, a mobile station according to the present invention is coupled to a base station according to the present invention via a high speed data RAT that provides exclusively for packetized data transfer. As discussed above, LTE is a data network of this nature. Flow then proceeds to decision block 303.

At decision block 303, the mobile station continues to monitor requirements for a voice call. If voice calling is not required, flow proceeds back to the beginning of the decision block 303. The data connection of block 302 is maintained and the mobile station continues to monitor requirements for voice. If a voice call is required, then flow proceeds to block 304.

At block 304, the mobile station (and corresponding base station) execute a fallback to a circuit switched RAT, such as CDMA2000. Flow then proceeds to decision block 305.

At decision block 305, the voice call is monitored to determine if it is to be terminated. If not, then flow proceeds back around to the decision block 305 and the call is continuously monitored. If termination is required, then flow proceeds to block 306.

At block 306, the mobile station executes a release order sequence to release the voice call. As part of the sequence, the base station sends the RAT information contained in the last ATIM to the mobile station as part of the release order. Thus, the method according to the present invention precludes any latencies associated with reception and processing of overhead messages and ATIMs. Flow then proceeds to block 307.

At block 307, the mobile station selects an available high speed data RAT from information that is provided by the base station in the release order. In accordance with conventional methods, a switchback to the selected RAT is coordinated with the base station. Flow then proceeds to block 308.

At block 308, the mobile station, in coordination with the base station, executes a switchback to the selected high speed RAT. Flow then proceeds to block 309 which ends the method.

Figure 4:
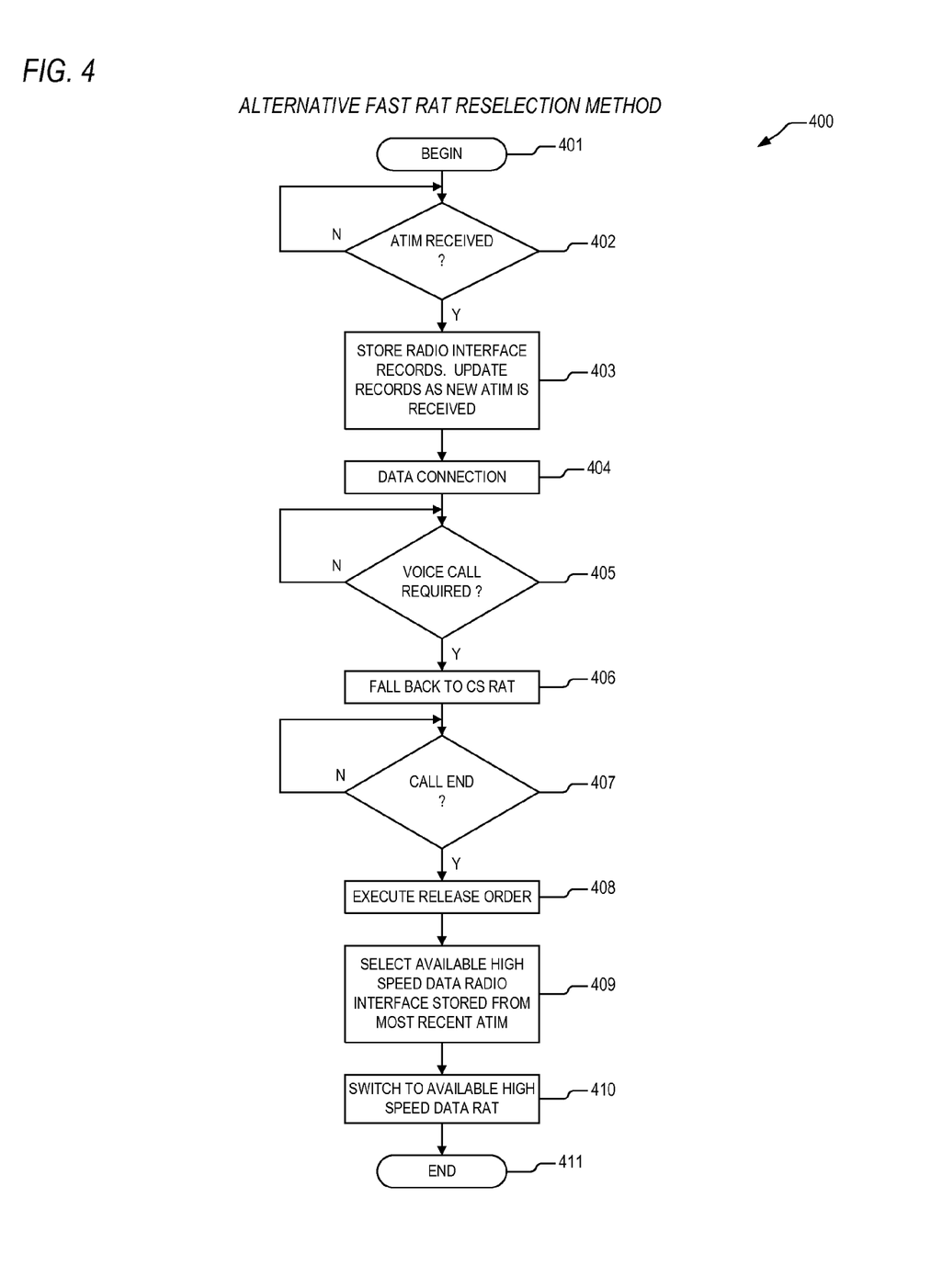
FIG. 4 is a flow diagram showing an alternative fast radio access technology reselection method according to the present invention.

Now turning to FIG. 4, a flow diagram 400 is presented showing an alternative fast radio access technology reselection method according to the present invention. In operation, a mobile station according to the present invention overcomes the limitations of present day systems by storing and updating the available RAT information provided in successive ATIMs and then uses this information to immediately select a high speed data RAT following termination of a voice call executed under CSFB protocol. In an LTE embodiment, the ATIM is added to the list of FORWARD-DEDICATED SCHEDULING CHANNEL (F-DSCH) messages in C.S0005 and C.S0004. One embodiment of an LTE-based ATIM is:

| ATIM Field | Length (bits) |
|---|---|
| NUM_RADIO_INTERFACE | 4 |
| NUM_RADIO_INTERFACE occurrences of the following Radio Interface record: | |
| { (NUM_RADIO_INTERFACE) | |
| RADIO_INTERFACE_TYPE | 4 |
| RADIO_INTERFACE_LEN | 10 |
| Radio Interface Type-specific fields | 8 × RADIO_INTERFACE_LEN |
| } (NUM_RADIO_INTERFACE) | |

Thus, flow begins at block 401 where a cellular communications system is providing both circuit switched voice links and high speed data links, where circuit switched fallback is the technique employed to process voice calls. Flow then proceeds to decision block 402.

At decision block 402, the mobile station determines whether an ATIM has been received. If not, flow proceeds back to the decision block 402 and continues to wait for an updated ATIM. If so, then flow proceeds to block 403.

At block 403, the mobile station extracts the available RAT information from the most recent ATIM received and stores/updates available RAT records for later use. Flow then proceeds to block 404.

At block 404, the mobile station according to the present invention is coupled to a base station according to the present invention via a high speed data RAT that provides exclusively for packetized data transfer, such as LTE. Flow then proceeds to decision block 405.

At decision block 405, the mobile station continues to monitor requirements for a voice call. If voice calling is not required, flow proceeds back to the beginning of the decision block 405. The data connection of block 404 is maintained and the mobile station continues to monitor requirements for voice. If a voice call is required, then flow proceeds to block 406.

At block 406, the mobile station (and corresponding base station) execute a fallback to a circuit switched RAT, such as CDMA2000. Flow then proceeds to decision block 407.

At decision block 407, the voice call is monitored to determine if it is to be terminated. If not, then flow proceeds back around to the decision block 407 and the call is continuously monitored. If termination is required, then flow proceeds to block 408.

At block 408, the mobile station executes a release order sequence to release the voice call. Flow then proceeds to block 409.

At block 409, the mobile station selects an available high speed data RAT from information that is stored from the last ATIM instance. In accordance with conventional methods, a switchback to the selected RAT is coordinated with the base station. Flow then proceeds to block 410.

At block 410, the mobile station, in coordination with the base station, executes a switchback to the selected high speed RAT. Flow then proceeds to block 411 which ends the method.

While the embodiment of FIG. 4 burdens a mobile station according to the present invention to provide store and update logic for the RAT information received in the ATIMs, this embodiment requires less changes to existing LTE standards by simply requiring that ATIM be added to the list of f-dsch messages in C.S0005 and C.S0004.

Figure 5:
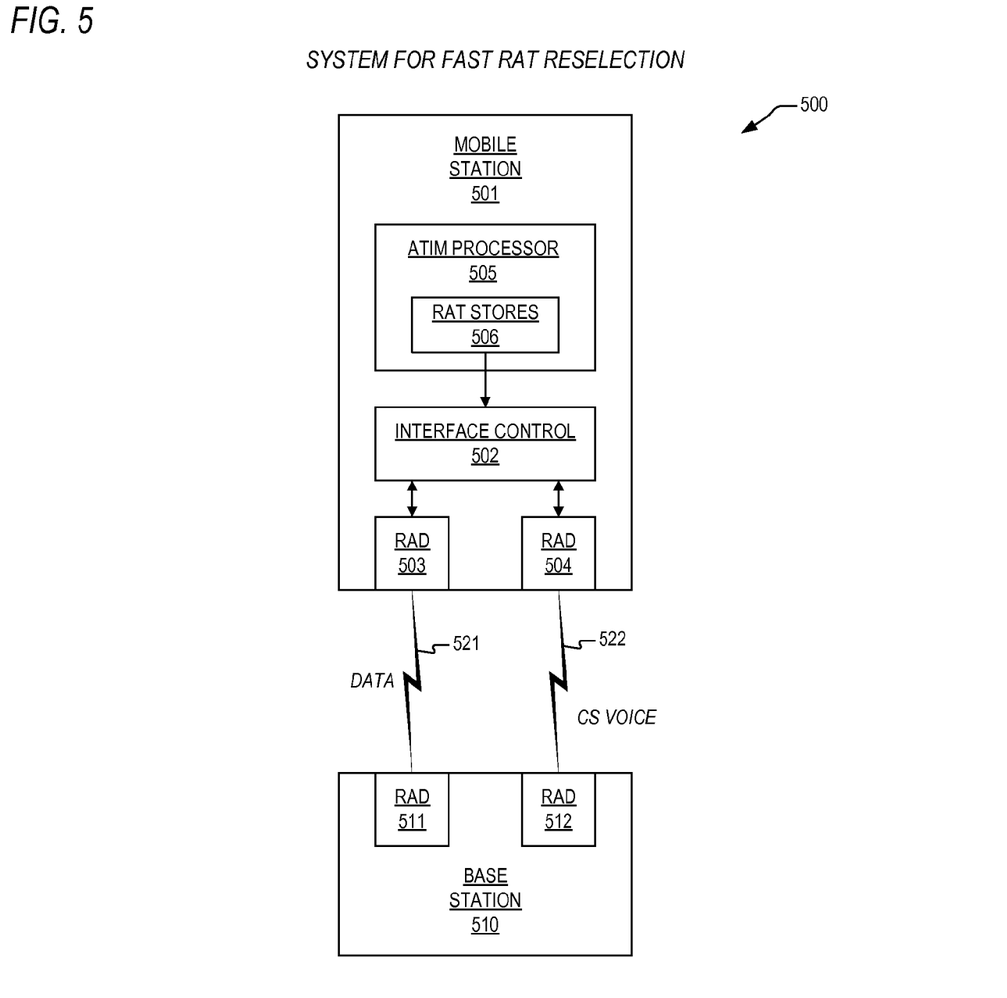
FIG. 5 is a block diagram illustrating a system for fast radio access technology reselection according to the present invention.

FIG. 5 is a block diagram is presented illustrating a system 500 for fast radio access technology reselection according to the present invention. The system 500 implements the method 400 discussed with reference to FIG. 4 where a mobile station 501 is required to store and update RAT information contained in the ATIMs. The mechanism includes a mobile station 501 that is wirelessly coupled to a base station 510 over two or more radio links 521, 522. The mobile station 501 includes two or more radio devices 503, 504 that couple the mobile station 501 to corresponding radio devices 511, 512 within the base station 510. The mobile station 501 also includes interface control 502 that is coupled to both radios 503, 504. In one embodiment, the mobile station 501 is coupled to a single base station 510 that includes radios 511, 512, as shown in the diagram. In another embodiment, the radios 511, 512 are disposed within separate base stations (not shown) within the system 500 that each include a specific type of radio 511, 512 unique to the technology employed, where communications are affected between the two base stations to allow for interconnectivity with the mobile station 501. Alternative embodiments contemplate a plurality of first radios 511 and a plurality of second radios 512, where various combinations of subsets of the plurality of first radios 511 and plurality of second radios 512 are disposed within a plurality of base stations, substantially similar to the base station 510 shown in FIG. 5.

In addition, the mobile station 501 may include more than the numbers of radios 511, 512 shown, to allow for communication over more that the two types of radio links 521, 522 shown for purposes of roaming, legacy compatibility, and other reasons. In one embodiment, the links 521, 522 are a circuit switched voice link 522 known as CDMA2000 and a high speed data link 521 known as Long Term Evolution (LTE), however, the disclosed aspects of the present invention are not limited to CDMA2000 and LTE and various other communications protocols and technologies are contemplated, such as Global System for Mobile Communications (GSM).

As is well known to those in the art, LTE do not include any provisions for placing a voice call according to any conventional methods. Accordingly, present day LTE specifications required that circuit switched fallback (CSFB) be utilized to place a voice call over the circuit switched link 522. Thus, when the mobile station 501 is currently utilizing the high speed data network 521 for packetized data communications, when a requirement arises for a voice call, CSFB techniques dictate that the mobile station fall back to a circuit switched radio link 522, to execute the voice call. And when the call is completed, the mobile station 501 executes a rapid switch back to one of the high speed data network links 521 to continue packetized communications at higher speed according to the method discussed above with reference to FIG. 4. Thus, the mobile station 501 also includes an ATIM processor 505 that is coupled to the interface control 502. The ATIM processor 505 has RAT stores 506 within which is stored RAT information taken from received ATIMs.

In operation, as ATIMs are periodically received, the ATIM processor 505 retrieves the RAT information therefrom and stores it in the RAT stores 506. And when a CSFB call terminates, the RAT information resident within the RAT stores 506 is accessed by the interface control 502. A specific RAT is selected for resumption of the high speed data interface and the interface control 502 coordinates with the base station 510 to effect communications over the corresponding high speed data link 521.

In another embodiment, the ATIM processor 505 retrieves RAT information from a release order received from a base station upon termination of a CSFB call, as is discussed above with reference to the method of FIG. 3. The RAT information may be placed in the RAT stores 506. Regardless, the RAT information is provided to the interface control 502, whereupon a specific RAT is selected for resumption of high speed data communications and the interface control 502 coordinates with the base station 510 to effect communications over the corresponding high speed data link 521.

The ATIM processor 505 and interface control 502 according to the present invention are configured to perform the above noted functions. The processor 505 and control comprise logic, circuits, devices, or microcode (i.e., micro instructions or native instructions), or a combination of logic, circuits, devices, or microcode, or equivalent elements that are employed to execute the noted functions according to the present invention. The elements employed to perform these functions may be shared with other circuits, microcode, etc., that are employed to perform other functions within the mobile station 501.

It is noted that the present invention should not be restricted simply to applications where a dual-mode mobile station is provided with both CDMA (1×) and LTE RATS. Certainly the present invention contemplates any multi-mode mobile station that provides for switching between disparate RATs such as phones having both GSM and CDMA (1×) capabilities, where an overall infrastructure behind the serving base stations provides for interchange of information regarding available RAT parameters. Indeed, it is contemplated that such an infrastructure provide the available RAT parameters either as part of a release order message sequence (or the equivalent) or that the mobile station be configured to store such periodically transmitted information so that it may reconnect to the other RAT following termination of a fallback session.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A wireless apparatus for performing a switchback to a first network, the wireless apparatus comprising:
   one or more first radios, coupled to one or more first communication links;
   one or more second radios, coupled to one or more second communication links with respect to the network;
   interface control, coupled to said one or more first and second radios, configured to select and execute communications over a specific one of said one or more second communication links following termination of a fallback session over one of said one or more first communication links, wherein radio access information is employed by said interface control to select said specific one of said one or more second communication links; and
   a processor, configured to receive, process, and provide to said interface control said radio access information, wherein said radio access information is received in a release order as part of termination of said fallback session, and wherein said release order comprises the radio access information contained in a last alternative technology information message.

2. The wireless apparatus as recited in claim 1, wherein said first radios comprise circuit switched radios, said second radios comprise data radios, said first communication links comprise circuit switched links, and said second communication links comprise data links that provide exclusively for packetized data communications.

3. The wireless apparatus as recited in claim 1, wherein said second communication links comprise one or more LTE links, and said first communication links comprise CDMA2000 links.

4. The wireless apparatus as recited in claim 1, wherein said second communication links and said first communication links are coupled to a base station, and wherein said radio access information is related to said second communication links which are coupled to said base station.

5. The wireless apparatus as recited in claim 1, wherein a plurality of said one or more second communication links and a plurality of said one or more first communication links are coupled to a plurality of base stations.

6. A system for performing a switchback to a data network, the system comprising:
   a first base station, configured to provide for wireless communications over one or more data links, wherein said one or more data links provide exclusively for packetized data communications; and
   a mobile station, wirelessly coupled to said first base station, said mobile station comprising:
   one or more circuit switched radios, coupled to one or more circuit switched links;
   one or more data radios, coupled to said one or more data links with respect to the data network;
   interface control, coupled to said circuit switched radios and data radios, configured to select and execute communications over a specific one of said one or more data links following termination of a circuit switched fallback call over one of said one or more circuit switched links, wherein radio access information is employed by said interface control to select said specific one of said one or more data links; and a processor, configured to receive, process, and provide to said interface control said radio access information, wherein said radio access information is received from said first base station in a release order as part of termination of said call, and wherein said release order comprises the radio access information contained in a last alternative technology information message.

7. The system as recited in claim 6, wherein said one or more data links comprise one or more LTE links, and said one or more circuit switched links comprise CDMA2000 links.

8. The system as recited in claim 6, wherein said one or more circuit switched links are provided by said first base station and a second base station which is connected to the mobile station.

9. The method as recited in claim 8, wherein the one or more data links comprise one or more LTE links and the one or more circuit switched links comprise CDMA2000 links.

10. The method as recited in claim 8, wherein the one or more data links and said one or more circuit switched links are coupled to a base station.

11. The method as recited in claim 8, wherein a first plurality of the one or more data links and the one or more circuit switched links are coupled to a plurality of base stations.

12. A method for performing a switchback to a data network, the method comprising:

within a mobile station, first coupling one or more circuit switched radios to one or more circuit switched links;

within the mobile station, secondly coupling one or more data radios to one or more data links, wherein the one or more data links provide exclusively for packetized data communications;

selecting and executing communications over a specific one of the one or more data links following termination of a circuit switched fallback call over one of the one or more circuit switched links, said selecting comprising:

employing radio access information to select said specific one of said one or more data links; and receiving, processing, and providing the radio access information, wherein the radio access information is received in a release order as part of termination of the circuit switched fallback call, and wherein the release order comprises the radio access information contained in a last alternative technology information message.

* * * * *